United States Patent
Decker, Sr. et al.

[11] Patent Number: 6,126,246
[45] Date of Patent: Oct. 3, 2000

[54] TOWED VEHICLE BRAKING SYSTEM

[76] Inventors: Dan Decker, Sr.; Dan Decker, Jr., both of P.O. Box 162, Sedalia, Colo. 80135-0162

[21] Appl. No.: 08/928,478

[22] Filed: Sep. 12, 1997

Related U.S. Application Data

[60] Provisional application No. 60/025,299, Sep. 13, 1996, abandoned.

[51] Int. Cl.[7] .................. B60T 13/74; B60T 7/12
[52] U.S. Cl. ...................... 303/7; 303/16; 303/3; 188/112 R
[58] Field of Search ............... 303/3, 7, 15, 16, 303/20; 188/3 H, 3 R, 112 R; 180/167; 74/512, 532

[56] References Cited

U.S. PATENT DOCUMENTS

| | | | |
|---|---|---|---|
| 1,907,835 | 5/1933 | Langbein | 73/132 |
| 2,566,859 | 9/1951 | Seeler | 74/512 |
| 2,676,225 | 4/1954 | Jubell | 188/3 R |
| 2,711,228 | 6/1955 | Shank | 188/3 H |
| 2,964,965 | 12/1960 | Hanson | 74/481 |
| 3,662,593 | 5/1972 | Pirello et al. | 73/132 |
| 3,866,719 | 2/1975 | Streutker | 188/3 R |
| 3,877,318 | 4/1975 | Castoe | 74/481 |
| 3,991,609 | 11/1976 | Asmus et al. | 73/132 |
| 4,186,595 | 2/1980 | Domitter | 73/132 |
| 5,012,689 | 5/1991 | Smith | 74/481 |
| 5,299,668 | 4/1994 | Younger et al. | 74/532 |
| 5,411,321 | 5/1995 | Harness | 188/3 H |

*Primary Examiner*—Paul N. Dickson
*Assistant Examiner*—Robert A. Siconolfi
*Attorney, Agent, or Firm*—Joseph C. Herring

[57] ABSTRACT

Towed vehicle braking systems which are flexible enough for use by rental agencies and provide good safety features use a compressor (15) to drive a fluid actuator (12) with a piston (11). The piston is attached to the towed vehicle's brake actuator (30), e.g., a brake pedal or hand grip. The free standing braking system case is positioned within the towed vehicle by a positioning mechanism (32), e.g., a scissors jack. The braking system is actuated by one or more of (a) a towed vehicle velocity decrease sensor (46 and 47) (46 and 52); (b) a separation of the towed vehicle and the towing vehicle sensor (63 and 64) and (c) coded signals from a transmitter (66), e.g., radio frequency, used by the driver to control the braking system of the towed vehicle when received by a towed vehicle receiver (67) and used to actuate the towed vehicle braking system.

17 Claims, 4 Drawing Sheets

TOWED VEHICLE BRAKING SYSTEM

This Application is based on Provisional Application 60/025,299, filed Sep. 13, 1996 now abandoned.

BACKGROUND OF THE INVENTION

A continuing problem exists with respect to towing small trailers, mobile homes, automobiles, etc. This is particularly true in hilly or mountainous terrain where braking on long downhill stretches of highways often causes overheating and consequent failure.

U.S. Pat. No. 5,411,321 to H. N. Harness summarizes some of the existing systems and teaches a towed vehicle braking system using a pneumatic actuator.

The system uses an electric signal from the towing vehicle to turn on a portable air compressor. The compressor provides the necessary air pressure needed to force a piston against the brake pedal of the towed vehicle. The system must, however, be bolted to the floor of the towed vehicle. In such a case, the floor mats must be removed or the bolts will I leave unsightly holes. The bolts will also destroy the integrity of the metal floor pan and provide an opportunity for water to flow into the passenger compartment when the vehicle is driven in flooded streets. Additionally, the anti-corrosion coatings on the floor pan will be punctured thereby leading to other problems.

Other systems run a cable in a window etc., leading to the possibility of cable and window damage.

The present invention provides a system which is suitable for use by individuals, trailer rental operations and other brake assist users. It need not be bolted to anything and it can be used as a total system or as one or more system components. In its preferred form, it consists of a self-contained towed vehicle braking system. To this system is preferably added braking mechanism which is actuated when the trailer separates from the towing vehicle. In the most preferred system, the towed vehicle driver can also initiate towed vehicle braking when the brakes of the towing vehicle are too hot and the towed vehicle brakes are relatively cool.

SUMMARY OF THE INVENTION

A towed vehicle braking system which does not require attachment to the floor, walls, or other part of the towed vehicle is made up of a compressor, a fluid actuator, and sensors contained within a case. Preferably, the fluid actuator is a double acting pneumatic or hydraulic cylinder with a piston. The remote end of the piston has a mechanism for connection to the towed vehicle's brake actuator. The case is locked into position between the brake actuator and, usually, the towed vehicle's front seat by a positioning mechanism.

In operation, the braking is initiated by one of a deceleration sensor, a break-away detector or by a radio frequency remote transmitter controlled by the towing vehicle operator. One or more of these Initiators can act to apply necessary braking. The braking can be modulated by the driver of the towed vehicle using the transmitter/receiver or maximally applied by the deceleration and/or break-away sensor devices.

DETAILED DESCRIPTION OF THE FIGURES

Figure 1:
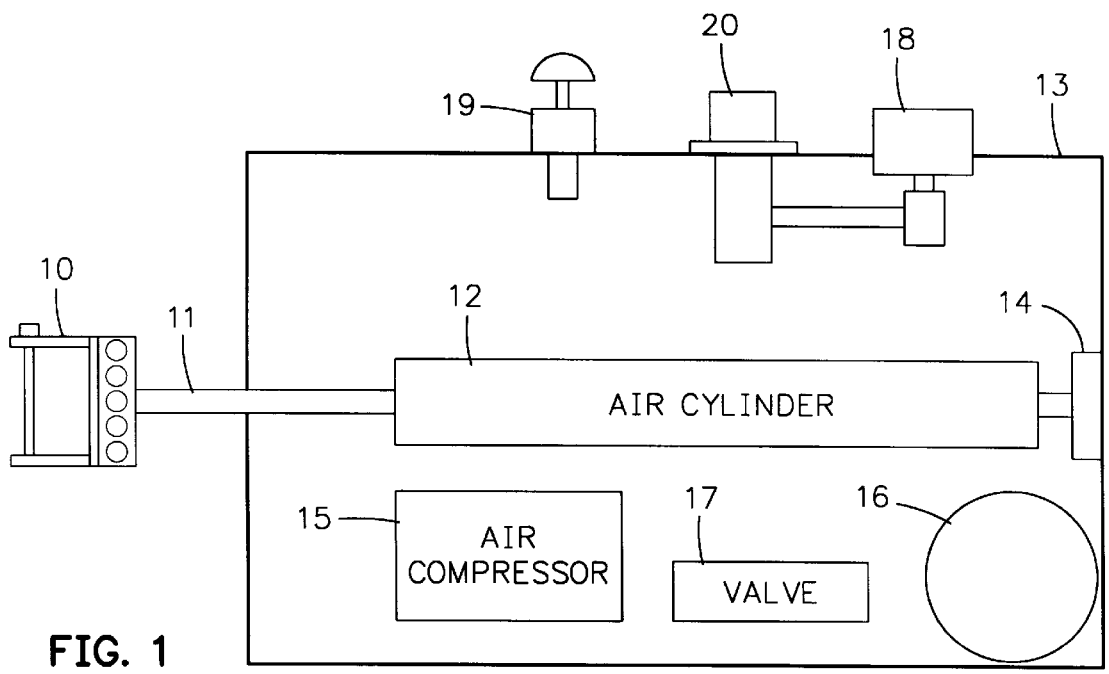
FIG. 1 is a schematic representation of a primary stand alone system.

The device of FIG. 1 shows brake attachment 10 connected to the piston 11 of a pneumatic fluid cylinder 12. The cylinder 12 is connected to case 13 via attachment foot 14. A fluid compressor 15 maintains a controlled pressure on the fluid within tank 16. A four way valve 17 controls the fluid flow between the compressor 15 and tank 16 and between tank 16 and fluid cylinder 12. A gauge 18 shows the amount of fluid pressure available, manual pressure control valve 19 is used in parallel to regulator 20 to adjust and control the minimum and maximum pressure desired for operation of the braking system.

Figure 2:
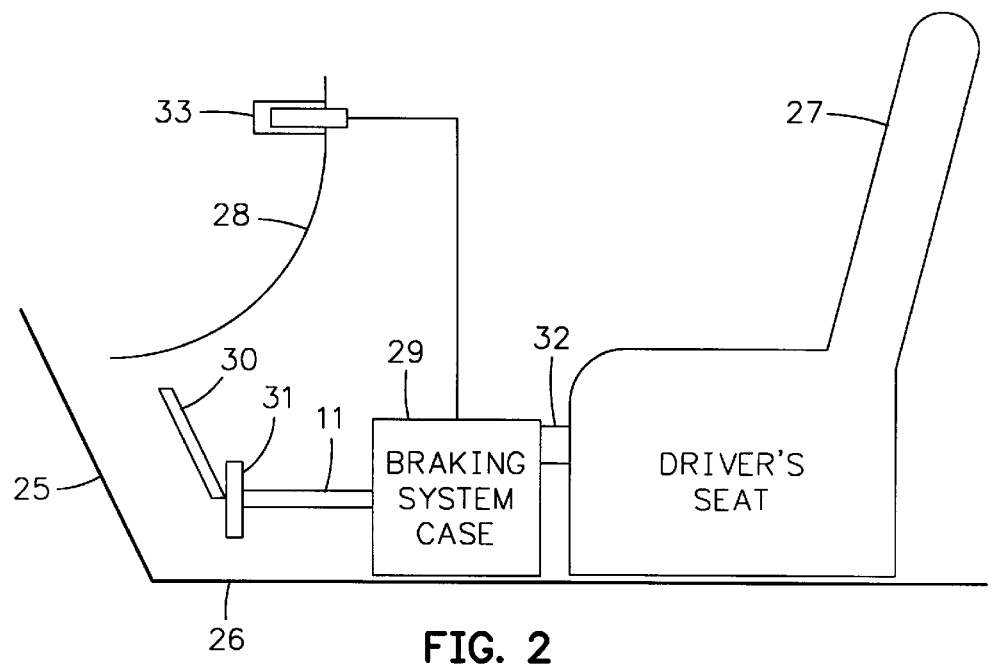
FIG. 2 is a schematic depiction of a system positioned for use in a vehicle.

FIG. 2 shows the towed vehicle fire wall 25, floor board 26, driver's seat 27, and dash board 28. The free-standing braking system case 29 is shown in position between a foot brake pedal or hand grip 30 and seat 27. In practice, the brake attachment 31 connects the actuator arm of the system to the brake pedal or grip 30. An adjustable positioning mechanism 32 is used to provide a snug fit between the drivers seat 27 and the brake pedal 30. Power source 33 can be the towing or towed vehicle's battery, a battery within the case 29, or, as in FIG. 2 the power source is the towed vehicle's cigarette lighter.

Mechanism 32 can be any jacking device, e.g., a scissors jack, or a shimming arrangement where different sized "blocks" are screwed, locked or otherwise attached to the case of system 29. Thus, a jacking arrangement would be ideal for units delivered to rental agencies for use in vehicles having differing cab configurations.

Figure 3:
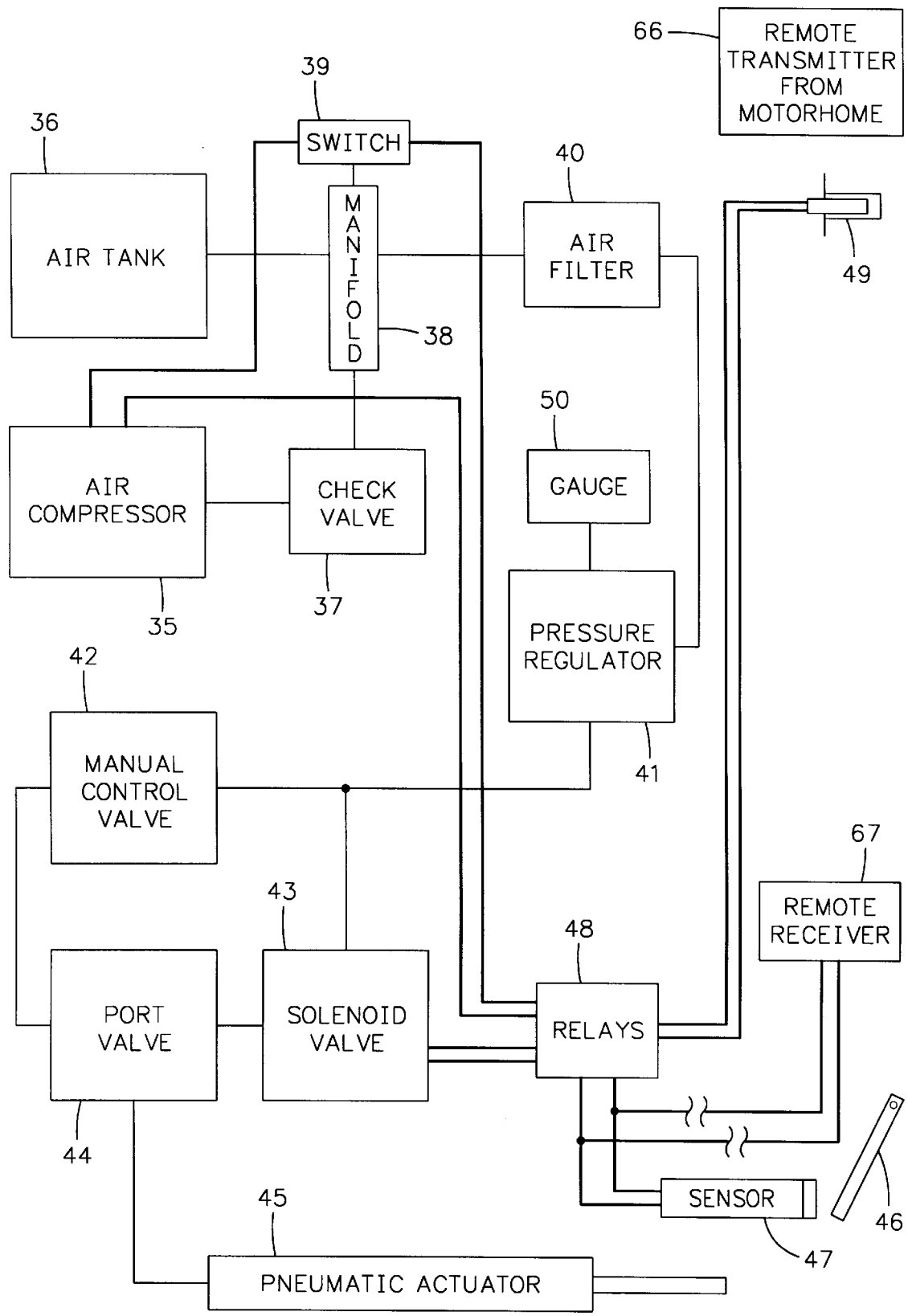
FIGS. 3 and 4 are schematics of preferred fluid systems.
Figure 4:
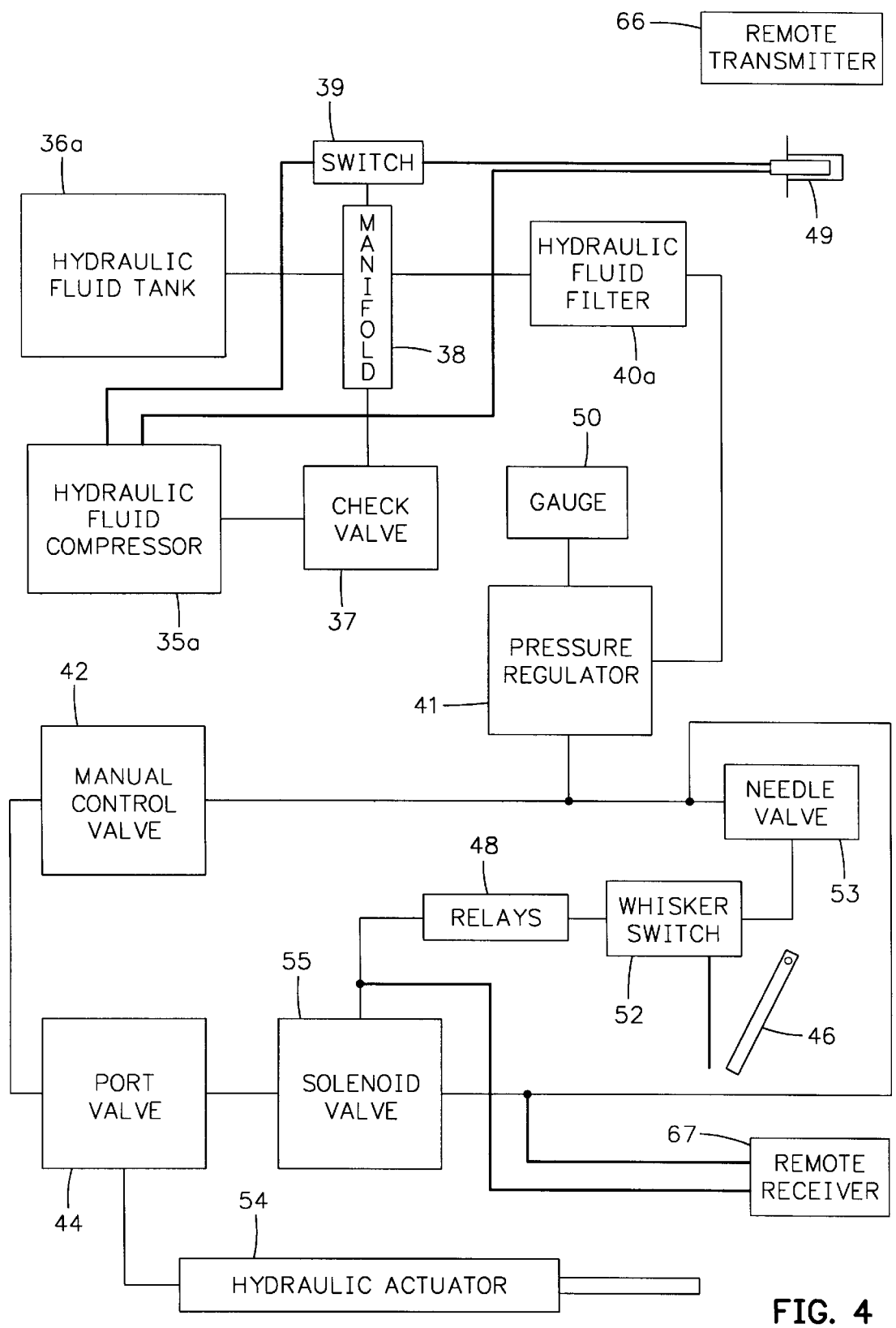

In FIGS. 3 and 4, electrical connections are shown as a thick line while fluid lines are all thin. In FIG. 3 air compressor 35 delivers air at pressures ranging from about 20 psi to about 75 psi to air tank 36 via check valve 37 and manifold 38 as controlled by pressure switch 39. In FIG. 4, a fluid compressor 35a, a hydraulic fluid tank 36a and a hydraulic fluid filter 40a are utilized. When in use, compressed air from tank 36 is directed through air filter 40 and pressure regulator 41 to manual control valve 42 and solenoid valve 43 into port valve 44 then to pneumatic actuator 45. The solenoid valve 43 is controlled by pendulum 46 through proximity sensor 47 and relays 48.

In FIG. 3 the towing vehicle brakes and slows, the pendulum 46 swings forward and contacts the proximity sensor 47, e.g., a micro switch. The electrical output signals of the micro switch sensor 47 actuates relays 48 causing air in FIG. 3, or hydraulic fluid in FIG. 4, to flow through solenoid valves 43 into pneumatic actuator 45 or hydraulic cylinder 54 in FIG. 4. The electrical system is powered by connection to a 12v source 49 which can be the cigarette lighter receptacle of the towed vehicle or a connection to the towing vehicle's trailer electrical hookup receptacle. The relays 48 electrical output also controls the switching on and off of compressor 35 via pressure switch 39.

Gauge 50 provides a visual display of pressure in the system which allows the user to manually adjust the air pressure in the system via pressure regulator 41.

The hydraulic system of FIG. 4 uses the same identifying numbers for equivalent hydraulic system components as those used in FIG. 3 where possible but identifies new elements with higher numbers. In this system the electrical circuitry originates at source 49 and powers only air compressor 35 via pressure switch 39.

Mechanical components substitute for some of the remaining electrical system components of FIG. 3. Thus, in FIG. 4, pendulum 46 displaces the whisker of switch 52 which utilizes liquid pressure derived from pressure regulator 41 via needle valve 53 to activate a small double acting hydraulic cylinder 54 and control the operation of solenoid valve 55. Valve 55 supplies hydraulic fluid under pressure to port valve 44 alternately or in parallel to that supplied via manual control valve 42. The double action hydraulic cylinder 54 controls the position of the piston.

Figure 5:
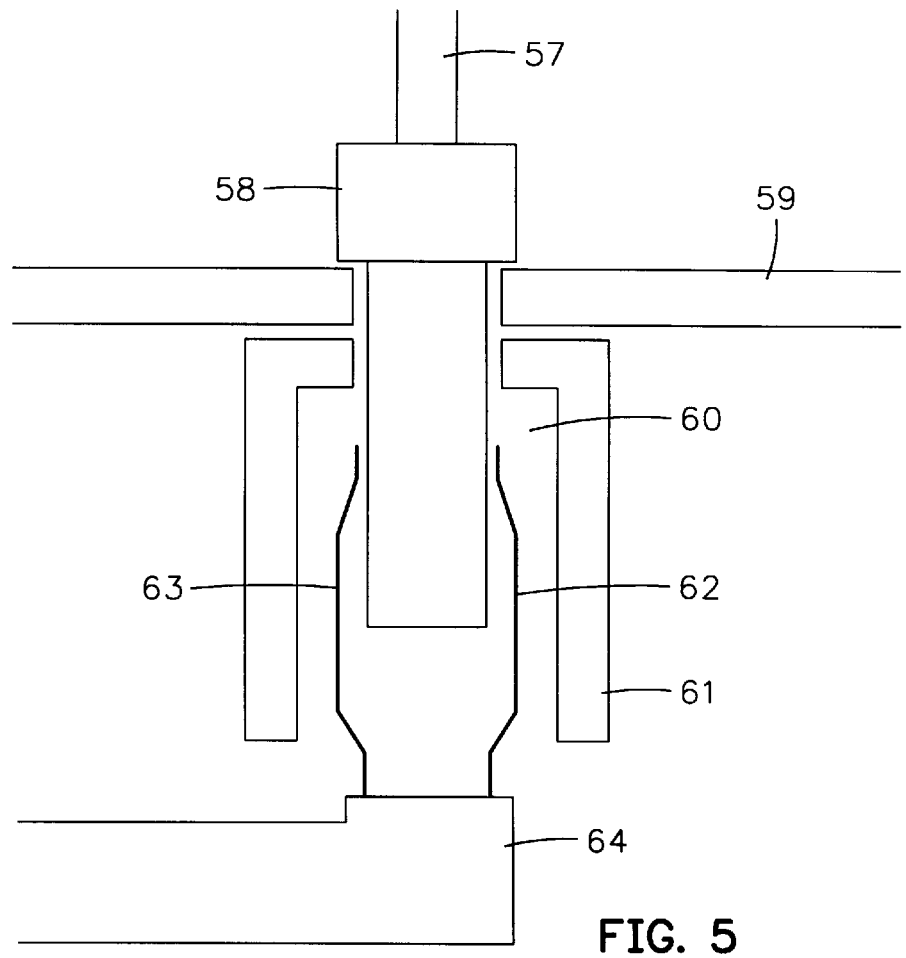
FIG. 5 is a partial schematic showing elements suitable for applying full braking in the event that the towed vehicle separates from the towing vehicle.

FIG. 5 depicts schematically an operating circuit device for initiating braking by either of the towed vehicle braking systems of FIGS. 3 and 4. The circuit device has a cable 57 which is anchored in or onto the towing vehicle at one end. At the other end, the cable is attached to an electrically non-conducting, male banana terminal 58 which passes through automotive panels 59 and seats in a hole 60 of female banana terminal 61. Terminal 61 protects and insulates spring-biased to closed electrodes 62 and 63 of cable 64 positioned within and attached to female banana terminal 61.

Figure 6:
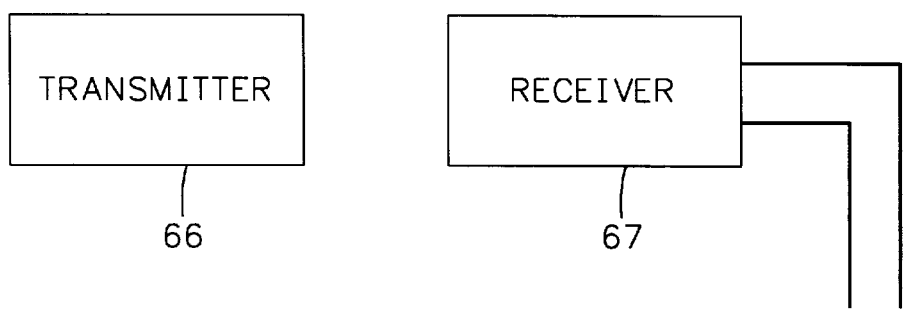
FIG. 6 is a partial schematic showing elements suitable for allowing the driver of the towing vehicle to apply braking via the towed vehicle braking system.

Electrodes 62 and 63 are attached to cable 64 which is, in FIG. 3, connected in parallel to sensor 47 and, in FIG. 4, to the wires from pressure switch 39 at compressor 35 as shown with respect to FIG. 6.

FIG. 6 schematically depicts a radio frequency transmitter 66 and receiver 67 for parallel connection to the inputs to relays 48 with proximity sensor 47 in the electrical circuit of FIG. 3 and as shown, or in parallel with the wires from pressure switch 39 at compressor 35 in FIG. 4. The units preferably transmit and receive coded signals to identify the transmitter 66 and receiver 67 and are preferably designed to also transmit coded messages enabling the driver of the towing vehicle to apply braking on an as-needed basis as justified by the road conditions and operator needs.

GENERAL DESCRIPTION OF THE INVENTION

The braking systems of this invention are preferably adapted to be connected to the foot pedal of a towed vehicle braking system but can be adapted for connection of the moveable piston rod to a hand brake or other braking control device.

Preferably, the fluid actuator is a double action pneumatic piston, but can be a double acting hydraulic piston. The actuator compressors are preferably coupled with compressed fluid storage containers. The fluid piping can be metal, plastic or a composite but preferably is a metal or metal alloy. The electrical circuits will provide the power supply and actuate the fluid compressor valve controls, relays, etc. necessary for operation of the system. Transmitters and receivers can most conveniently operate using radio or light frequencies.

The fluid circuitry will be primarily the piping normally used at the pressures for which the towed vehicle braking is designed. These pressures will normally be in the range of 20 to 100 psi but can be higher if the weight of the towed vehicle is greater than lighter towing vehicles. The circuitry can be easily adapted to operate proximity sensor, fail safe and radio or other controls in parallel. Additionally, the radio controlled systems can be used to operate with a constant fluid pressure and/or variable flow pressure valving to achieve desired pressures and degrees of braking, e.g., when on dry roads, wet roads and roads covered with ice. Light-weight towed vehicles are preferably autos, pickup trucks and the lighter mobile homes.

The fluid circuits are controlled by the mechanical relays and electronic switches which are used to control the solenoid and motor controlled valves needed to provide the electrical power for operating the compressor so as to supply fluid under pressure to the predetermined amounts of towed vehicle braking actuator devices.

What is claimed is:

1. In a towed vehicle braking system having components substantially within a braking system case and including a fluid compressor, a fluid actuator with a moveable piston, a mechanism for connecting the piston to the towed vehicle brake actuator, circuitry for controlling the fluid actuator and means for sensing decreases in a towing vehicle's velocity connected to operate the circuitry to obtain braking pressures in the system's braking system, the improvement comprising:

free-standing means for positioning the system on a floor of the towed vehicle between a driver's seat and the vehicle brake actuator;

at least one of
  means for sensing decreases in towing vehicle velocity and
  means for sensing separation of the towing vehicle from the towed vehicle
connected to at least one of the fluid circuitry and electrical circuitry to cause predetermined braking by the towed vehicle's braking system on a decrease in velocity of the towing vehicle and/or separation of the towing vehicle from the towed vehicle; and remote towed vehicle braking control transmitter, usable by a towing vehicle driver to transmit coded signal(s) to a towed vehicle receiver braking system, and connected to the at least one of the fluid circuitry and electrical circuitry of the towed braking system to cause braking by the towed vehicle braking system on receipt of appropriate coded signals.

2. The system of claim 1 wherein the towed vehicle braking system is a pneumatically operated system.

3. The system of claim 1 wherein the towed vehicle braking system is a hydraulically operated system.

4. The system of claim 1 wherein the braking system is housed within a case.

5. The system of claim 4 wherein the braking system case has attached thereto an adjustable positioning means to enable the system to be fixed substantially in position without attachment to the vehicle.

6. The system of claim 5 wherein the adjustable positioning means is a jacking device.

7. The system of claim 5 wherein the adjustable positioning means is a shimming device.

8. The system of claim 5 wherein the adjustable positioning means is a scissors jacking device.

9. The system of claim 1 wherein the system can utilize fluid braking pressures of 20–75 psi.

10. The system of claim 1 wherein the mechanism for connecting the moveable piston to the towed vehicle braking system is adapted to be attached to a foot pedal.

11. The system of claim 1 wherein the mechanism for connecting the moveable piston to the towed vehicle braking system is adapted to be attached to a hand grip.

12. The system of claim 1 wherein the power source is a battery located within the braking systems case.

13. The system of claim 1 wherein the power source is the towed vehicle's battery.

14. The system of claim 1 wherein the power source is the towing vehicle's battery.

15. The system of claim 1 wherein the towing vehicle velocity decrease sensor is a pendulum and micro switch.

16. The system of claim 1 wherein the towing vehicle velocity decrease sensor is a pendulum and a proximity sensor.

17. In a towed vehicle braking system having components substantially within a braking system case and including a fluid compressor, a fluid actuator with a moveable piston, a mechanism for connecting the piston to one of a brake pedal and a hand grip means, circuitry for controlling the fluid actuator and means for sensing decreases in a towing vehicle's velocity connected to operate the circuitry to obtain braking pressures of 20–75 psi in the system's braking system, the improvement comprising:

free-standing means for positioning the system on a floor of the towed vehicle between a driver's seat and the vehicle brake actuator;

at least one of means for sensing decreases in towing vehicle velocity and means for sensing separation of the towing vehicle from the towed vehicle connected to at least one of the fluid circuitry and electrical circuitry to cause predetermined braking by the towed vehicle's braking system on a decrease in velocity of the towing vehicle and/or separation of the towing vehicle from the towed vehicle; and remote towed vehicle braking control transmitter, usable by a towing vehicle driver to transmit coded signal(s) to a towed vehicle receiver braking system, and connected to the at least one of the fluid circuitry and electrical circuitry of the towed braking system to cause braking by the towed vehicle braking system on receipt of appropriate coded signals and located external to the case enclosure, an attached adjustable positioning means comprising at least one of a scissors jack and shims, the system being powered by at least one of a self contained battery and electrical power from the towing vehicle and the towing vehicle velocity decrease sensor is one of a pendulum and a microswitch and a pendulum and a proximity sensor.

* * * * *